(12) United States Patent
Boutaghou et al.

(10) Patent No.: US 7,209,325 B2
(45) Date of Patent: Apr. 24, 2007

(54) SUSPENSION DAMPING METHOD WITH MINIMUM IMPACT ON PRELOAD STIFFNESS

(75) Inventors: Zine-Eddine Boutaghou, North Oaks, MN (US); Peter Segar, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 309 days.

(21) Appl. No.: 10/465,346

(22) Filed: Jun. 19, 2003

(65) Prior Publication Data

US 2004/0061975 A1   Apr. 1, 2004

Related U.S. Application Data

(60) Provisional application No. 60/414,016, filed on Sep. 27, 2002.

(51) Int. Cl.
*G11B 5/54* (2006.01)
(52) U.S. Cl. .............................. 360/244.2; 360/244.8; 360/245.9
(58) Field of Classification Search ............ 360/244.2, 360/244.8, 245.8, 245.9
See application file for complete search history.

(56) References Cited

U.S. PATENT DOCUMENTS

| | | | |
|---|---|---|---|
| 4,351,870 A * | 9/1982 | English, Jr. ................ 428/174 |
| 4,734,805 A * | 3/1988 | Yamada et al. .......... 360/244.8 |
| 5,126,904 A * | 6/1992 | Sakurai .................... 360/244.2 |
| 5,825,590 A * | 10/1998 | Ohwe ....................... 360/244.8 |
| 6,028,742 A * | 2/2000 | Kazama .................... 360/244.8 |
| 6,049,443 A * | 4/2000 | Grill et al. ............... 360/244.8 |
| 6,141,187 A * | 10/2000 | Wong et al. ............. 360/244.8 |
| 6,212,043 B1 * | 4/2001 | Nakamura et al. ....... 360/244.3 |
| 6,271,996 B1 * | 8/2001 | Houk et al. .............. 360/244.9 |
| 6,282,062 B1 * | 8/2001 | Shiraishi ................. 360/244.1 |
| 6,297,933 B1 * | 10/2001 | Khan et al. .............. 360/244.2 |
| 6,307,715 B1 * | 10/2001 | Berding et al. .......... 360/244.8 |
| 6,359,755 B1 * | 3/2002 | Dietzel et al. ........... 360/244.3 |
| 6,388,842 B1 * | 5/2002 | Murphy ................... 360/244.8 |
| 6,433,967 B1 * | 8/2002 | Arya ....................... 360/244.8 |
| 6,704,164 B1 * | 3/2004 | Hiraoka ................... 360/244.8 |
| 6,801,405 B2 * | 10/2004 | Boutaghou et al. ...... 360/265.9 |
| 2004/0256868 A1 * | 12/2004 | Yoon .......................... 293/120 |

* cited by examiner

*Primary Examiner*—Jefferson Evans

(57) ABSTRACT

The present invention relates to a suspension assembly that includes a load beam having a bend section with a bending stiffness and an in-plane stiffness. The assembly also includes a constraint or stiffening layer cooperatively attached to the bend section. The constraint layer includes a pattern formed therein, and the constraint layer is arranged and configured to increase the in-plane stiffness of the bend section and to maintain a substantially constant bending stiffness of the bend section. The constraint layer pattern may be preformed or may be formed in the constraint layer after the constraint layer has been mounted to the bend section.

29 Claims, 7 Drawing Sheets

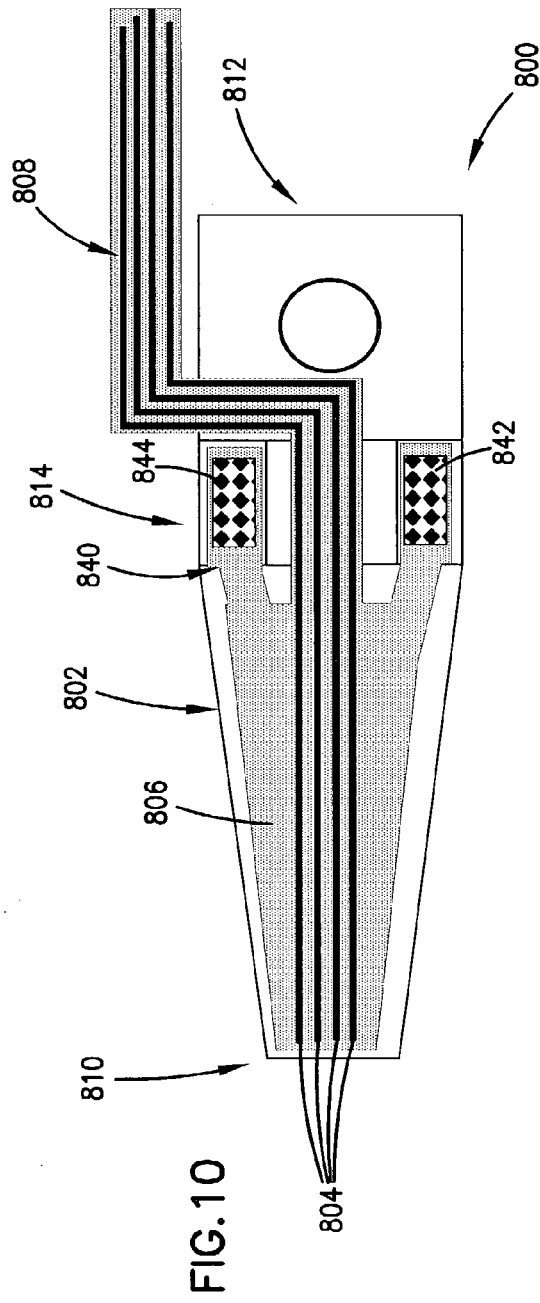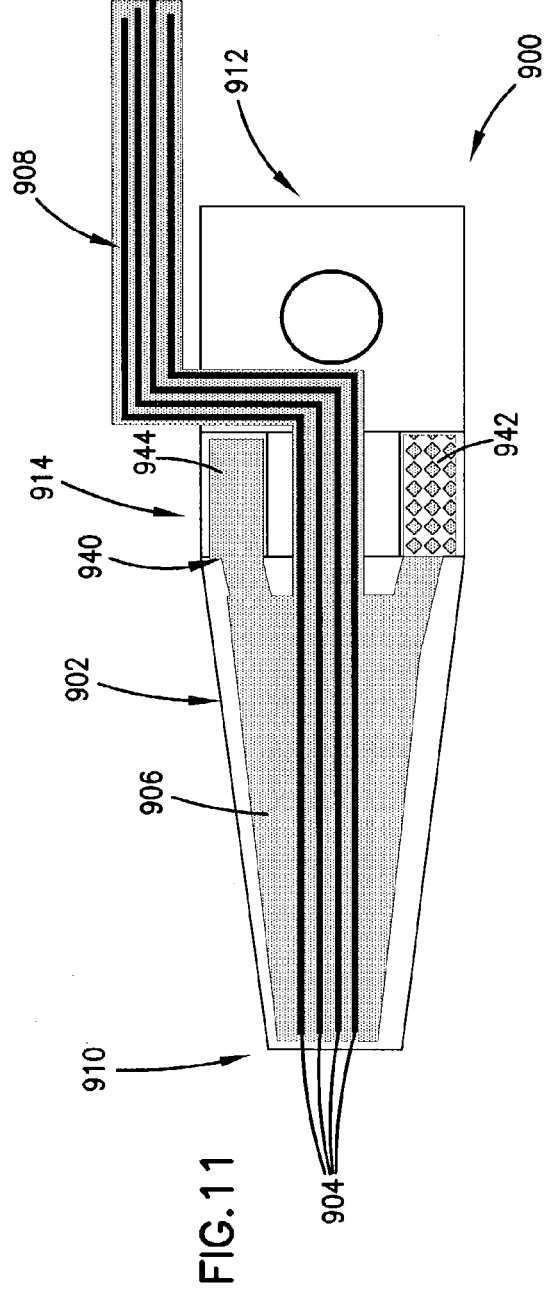

SUSPENSION DAMPING METHOD WITH MINIMUM IMPACT ON PRELOAD STIFFNESS

CROSS REFERENCE TO RELATED APPLICATIONS

This application claims priority from U.S. Provisional Application Ser. No. 60/414,016, filed Sep. 27, 2002 and entitled SUSPENSION DAMPENING METHOD WITH MINIMUM IMPACT ON PRELOAD STIFFNESS.

BACKGROUND OF THE INVENTION

1. Field of the Invention

The present invention relates to data storage devices. In particular, the present invention relates to improving performance of suspension assemblies in data storage devices.

2. Related Art

In data storage devices, data is typically stored in tracks on a memory medium. To access the data, the head is positioned within a track of the memory medium while the medium moves beneath the head. In many storage devices, the head is positioned by an actuator assembly that includes a motor that rotates one or more actuator arms. Each actuator arm supports one or two suspensions that each support a head/gimbal assembly. Typically, a suspension includes three distinct areas: a boss plate area that connects to the actuator arm, a spring area that provides a vertical spring force to bias the head toward the medium, and a load beam that extends from the spring area to the head/gimbal assembly. A spring force provided by the suspension is designed to allow the head to follow height variations on the surface of the medium without impacting the medium or moving too far away from the medium. Typically, it is desired that the spring area be more elastic or flexible than the remainder of the suspension. However, if the spring area or the remainder of the load beam is too elastic and compliant the load beam will tend to bend and resonate in response to various forces applied to the suspension.

A suspension is capable of resonating in three different axes: bending, torsion, and lateral or sway. The bending mode of vibrations depends on bending stiffness. To increase bending modes of vibrations, the bending stiffness can be increased and inertia reduced. Bending stiffness, however, cannot simply be increased without weighing other factors. By increasing bending stiffness too much, gram load sensitivity is increased due to vertical translation of the suspension. This is undesirable because it makes the tolerances of the head stack assembly more critical.

Similarly, to improve torsional modes of vibrations, an increase in torsional stiffness and a reduction in inertia are required. But torsional stiffness and bending stiffness are coupled together because both derive from the same spring portion of the load beam. In order to reduce torsional inertia, mass needs to be reduced as well as the distance from the torsional axis to the center of gravity. This can be achieved by reducing the width of the suspension, but reducing the suspension width decreases lateral bending or sway mode resonance. Also, narrowing of the suspension width and other reductions in mass can change the vertical stiffness, which may require additional re-working of the head stack assembly to achieve the desired gram load to the head/gimbal assembly Control of resonant induced vibrations have become very important as disc drive technology continues to increase in complexity and performance requirements. For example, many high performance disc drives run at 15 k RPM or higher, causing significant windage forces within the disc drive. Also, there is an increasingly higher number of bits being packed into every square inch of the disc drive surface, leading to a higher number of tracks per inch and a reduced track width. As a result, suspensions are more susceptible to slider off-track motion and other mechanical resonant vibrations that lead to reduced servo bandwidth and reduced track following capabilities of the disc drive.

One way of minimizing the effects of resonant induced vibrations in the suspension is to provide a dampening feature. Dampening features added to various portions of the suspension assembly may reduce the vibrations by stiffening the suspension in certain axes. Known dampening methods may provide desired dampening characteristics, but typically significantly alter the mass of the suspension or change the preload force applied to the head of the suspension.

A dampening feature for a suspension assembly that provides dampening of vibrations in specific axes of the suspension while maintaining other characteristics of the suspension, such as preload forces to the head, would be an important advance in the art.

SUMMARY OF THE INVENTION

One aspect of the invention relates to a disc drive suspension assembly that includes a load beam having a bend section with a bending stiffness and an in-plane stiffness. The assembly also includes a constraint layer cooperatively attached to the bend section. The constraint layer includes a pattern formed therein, and the constraint layer is arranged and configured to increase the in-plane stiffness of the bend section while maintaining a substantially constant bending stiffness of the bend section.

Another aspect of the invention relates to a disc drive suspension load beam that includes a patterned layer distinct from the load beam. The patterned layer is secured to a bend section of the load beam and is configured to increase an in-plane stiffness of the bend section while maintaining a substantially constant bending stiffness of the bend section. The patterned layer may formed from a separate constraint layer or may be formed from a flex circuit mounted to the load beam.

A yet further aspect of the invention relates to a method of increasing an in-plane stiffness of a disc drive suspension load beam. The method includes the steps of mounting a stiffener layer to a bend section of the load beam, mounting a patterned photo-resistive layer to the stiffener layer, etching the stiffener layer so as to form a patterned profile in the stiffener layer matching the pattern of the photo-resistive layer, and removing the photo-resistive layer. The stiffener layer may increase the in-plane stiffness of the load beam while maintaining a substantially constant bending stiffness of the load beam.

Another aspect of the invention relates to a method of increasing a in-plane stiffness of a disc drive suspension load beam that includes the step of mounting a patterned stiffener layer to a bend section of the load beam with an adhesive to increase the in-plane stiffness of the load beam while maintaining a substantially constant bending stiffness of the load beam.

These and various other features as well have advantages that characterize the present invention and will be apparent upon reading of the following detailed description and review of the associated drawings.

BRIEF DESCRIPTION OF THE DRAWINGS

FIG. 10 is a schematic top plan view of a section of a suspension assembly having mounted to it a flex circuit having one example patterned section according to principles of the invention.

FIG. 11 is a schematic top plan view of a section of a suspension assembly having mounted to it a flex circuit having another example patterned section according to principles of the invention.

DETAILED DESCRIPTION OF THE PREFERRED EMBODIMENT

Figure 1:
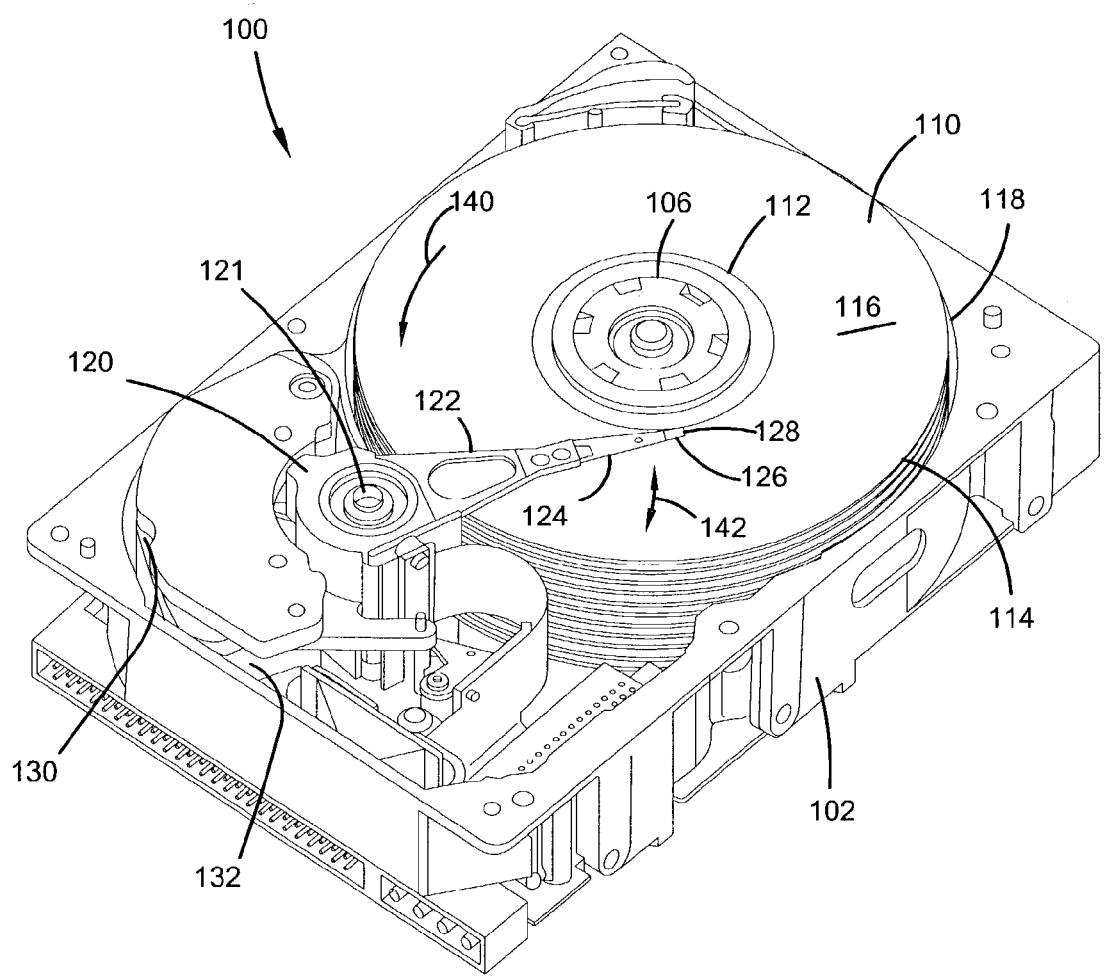
FIG. 1 is a top perspective view of a disc drive showing various features of the disc drive in which embodiments of the present invention may be practiced.

FIG. 1 is an asymmetric view of a disc drive 100 having structure in which principles of the present invention may be practiced. The disc drive 100 includes a base 102, and a cover (not shown). Base 102 and the cover form a disc drive enclosure. Extending into base 102 is a spindle motor 106 to which several discs 110 are secured. Each disc 110 is generally angular in shape, with an inner edge 112 and an outer edge 114 circumscribing opposing disc surfaces 116 (of which only one is visible in the drawing) to which data can be stored for later retrieval. Base 102 provides a cavity or room for disc 110 to be seated in a substantially coaxial arrangement, with an inner wall 118 of the base running around outer edges 114 of disc 110, substantially transverse to disc surfaces 116.

On one side of a pivot 121, an actuator assembly 120 includes a plurality of arms 122 to which are attached load beams or suspensions 124. At the end of each suspension 124 is a slider 126 that carries the read/write devices (designated generally by 128). The present invention is equally applicable to sliders having different types of read/write devices, such as what is generally referred to as transducers, magneto resistive heads, giant magneto resistive heads, or tunneling magneto resistive heads. On another side of the pivot, actuator assembly 120 extends to support a voice coil 130 next to one or more magnets 132 fixed relative to base 102. When energized, resultant electromagnetic forces on voice coil 130 cause actuator assembly 120 to rotate about pivot 121, thereby bringing the read/write devices into various radio locations relative to disc surfaces 116. It can be seen that, with spindle motor 106 rotating discs 110 for example, in a direction indicated by arrow 140, and actuator assembly 120 moving read/write heads 128 in an arcuate path, as indicated by arrow 142, across disc surfaces 116, various locations on disc surfaces 116 can be accessed by the read/write heads for data recordation or retrieval.

As discs 110 are rotated, fluid or air adjacent to disc surfaces 110 is also brought into motion, generating air streams or flow currents in the disc drive enclosure. This airflow, or windage, create forces both in direction 140 in the plane of disc surfaces 116, as well as a direction normal to the plane of disc 116. There also may be various other windage-induced forces occurring throughout the cavity defined by base 102 and cover (not shown).

Figure 2:
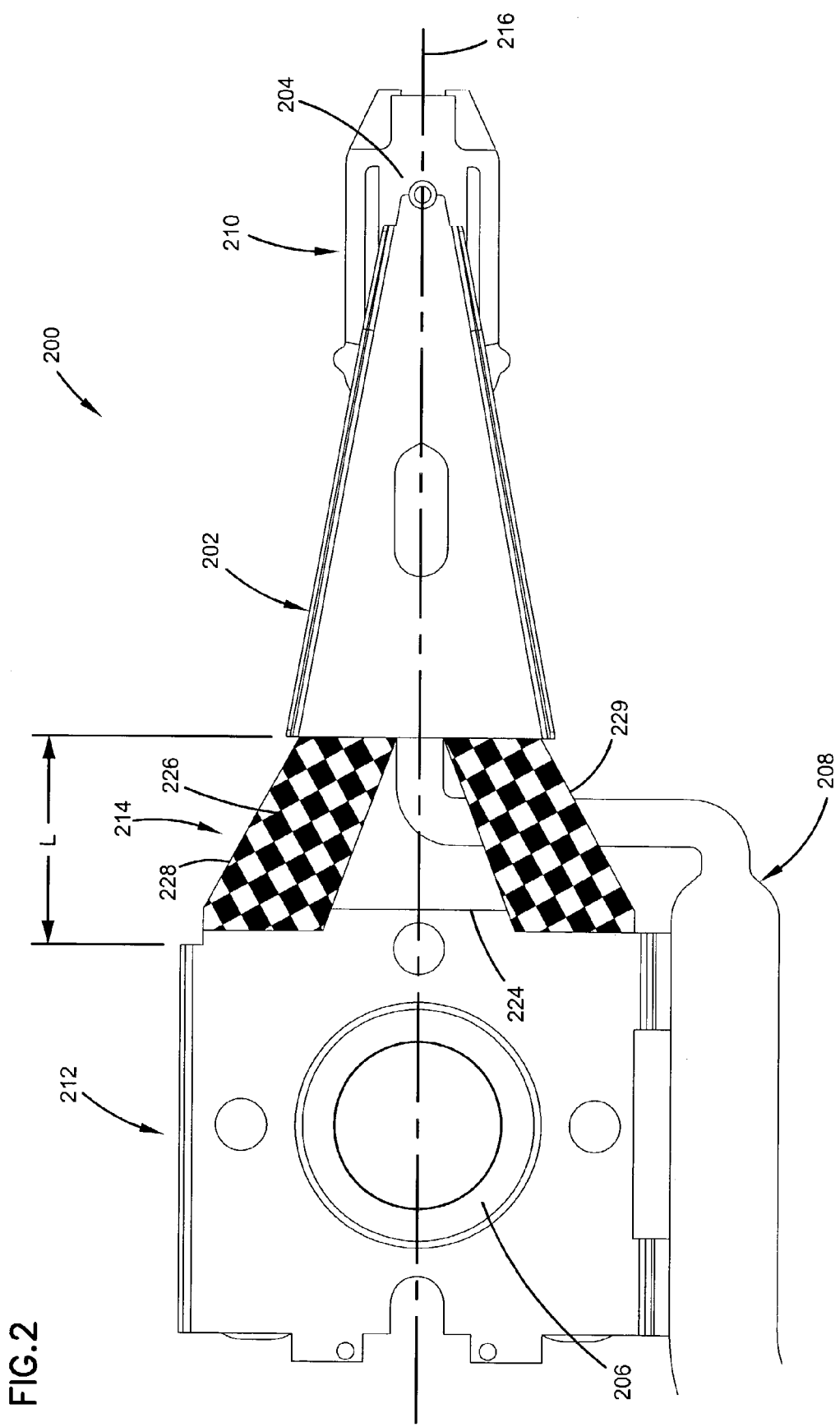
FIG. 2 is a top plan view of a section of a suspension assembly having mounted to it one example of a patterned stiffener layer according to principles of the invention.

One suspension assembly 200 that includes example features of the present invention is illustrated in FIG. 2. Suspension assembly 200 includes a load beam 202, a head or slider 204, a base plate 206 (only partially shown; positioned on an opposing side of load beam 202), and an interconnect wiring 208, such as a flex circuit. The load beam 202 includes first and second ends 210, 212 with a longitudinal axis 216 extending between the first and second ends. A bend section 214 is positioned between first and second ends 210, 212 and is configured to provide a preload force to head 204 that is supported at first end 210.

Load beam 202 may also include a patterned stiffener layer 226 that is part of bend section 214. The patterned stiffener layer 226 may have a variety of different designs, as discussed below, and preferably extends along an entire length L of the bend section and across an entire width of the bend section defined by outer sides 228, 229. In some embodiments, the bend section may include a cut out portion 224 designed to alter the suspension mass or change the in plane and bending stiffness of the bend section. In some embodiments, the patterned stiffener layer 226 may extend along only a portion of the length L or across only a portion of the width of bend section 214. Preferably, patterned stiffener layer 226 is symmetrically distributed on bend section 214 about the longitudinal axis 216 of the load beam 202. The symmetry of any feature added to load beam 202, such as the patterned stiffener layer 226 may be significant for controlling vibrations and providing a predictable performance by the suspension assembly.

Figure 3:
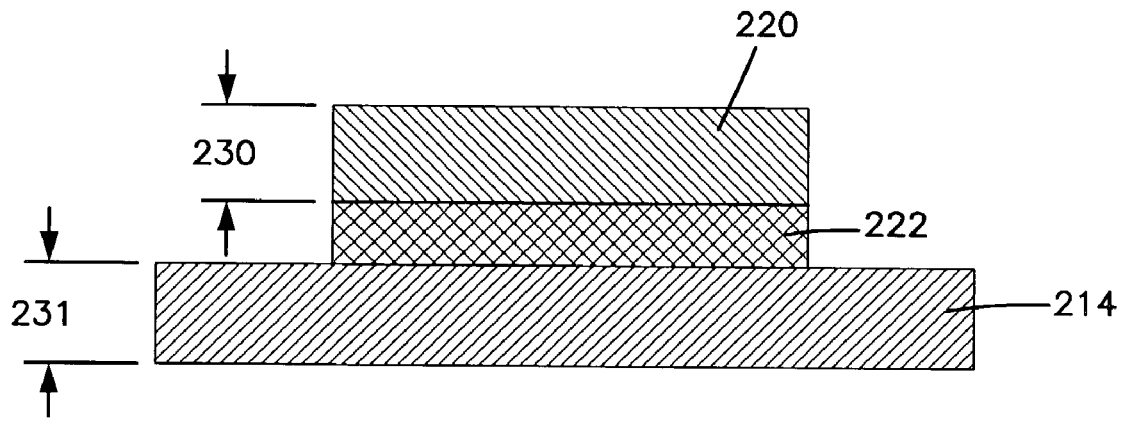
FIG. 3 is a schematic cross-sectional view of a known embodiment of a stiffener layer mounted to a preload bend section of a load beam.

The concept of adding a constraint layer on top of the preload bend region of a load beam is known in the art. For example, FIG. 3 schematically represents a bend section 214 to which a constraint layer 220 has been mounted using an adhesive 222. The constraint layer 220 is made of a metallic substance, such as steel, or another material with high in-plane stiffness such as a polymer or composite material. The addition of constraint layer 220 provides dampening in the bend section by transferring the lateral forces present in the bend section into the constraint layer, which results in dissipation of the vibrations. Dampening is particularly effective for reducing the resonance, especially in the bend region of the load beam. However, increases in dampening provided by the addition of a constraint layer, such as constraint layer 220, typically results in a change in preload forces applied to a head supported by the suspension assembly. Specifically, the dampening layer may cause significant changes in preload force at different temperatures, and may also increase preload stiffness of the suspension. Because of these drawbacks, dampening structures have been difficult to implement while maintaining performance standards for the suspension assembly.

The bending stiffness of a bend section is related to the thickness of the bend section in a 3 to 1 relationship ($t^3$). Thus, as the thickness of the overall stack of material in the bend section region increases (the thickness of the constraint layer 230 plus the thickness 231 of the bend section material), the bending stiffness will increase three-fold. The in-plane stress, on the other hand, is related to the net cross-sectional thickness of the bend section region (the thickness defined by thickness 230 combined with thickness 231) in a 1 to 1 ratio. As a result, the in-plane stress increases in direct proportion ($t^1$) to increases in the net cross sectional thickness of the bend section.

While in-plane stiffness is desirable for maximizing dampening and increasing the resistance to motion of the bend section, it is desirable to maintain the same out-of-plane (bending) stiffness. A constant bending stiffness results in little to no impact on the preload stiffness of the bend section that would otherwise affect the load applied to a head supported by the suspension assembly.

The present invention provides one solution for attaining the objectives of increasing in-plane stiffness while maintaining a constant out-of-plane stiffness in the bend section of a load beam. The present invention provides a configuration in which a shell or plate structure, such as the constraint layer 220 shown in FIG. 3, is transformed to act like a group of beams or beam-like structures in the out-of-plane direction. This configuration preserves the stiffness of the shell or plate-like structure in the in-plane direction to maximize the resistance to motion of the bend section. One example of a patterned stiffener layer 226 that meets the above stated objectives is illustrated in FIG. 2.

Figure 4:
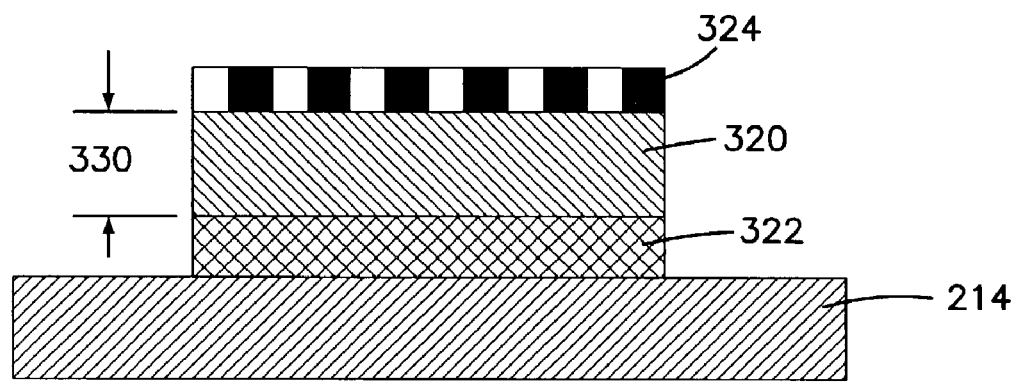
FIG. 4 is a schematic cross-sectional view of one example embodiment of a stiffener layer mounted to a preload bend section of a load beam with a photo-resistive etching layer mounted to a top surface of the stiffener layer according to principles of the present invention.

A patterned stiffener layer according to principles of the invention may be added to a bend section in several different ways. Referring now to FIG. 4, one method of adding a patterned stiffener layer to a bend section of a load beam includes mounting a constraint layer 320 to the bend section 214 using an adhesive 322. An etching patterned layer 324 is mounted to a top surface of constraint layer 320. The etching patterned layer has a specific design with a predetermined aspect ratio that, through an etching process, will result in a pattern being formed in the constraint layer 320.

Figure 5:
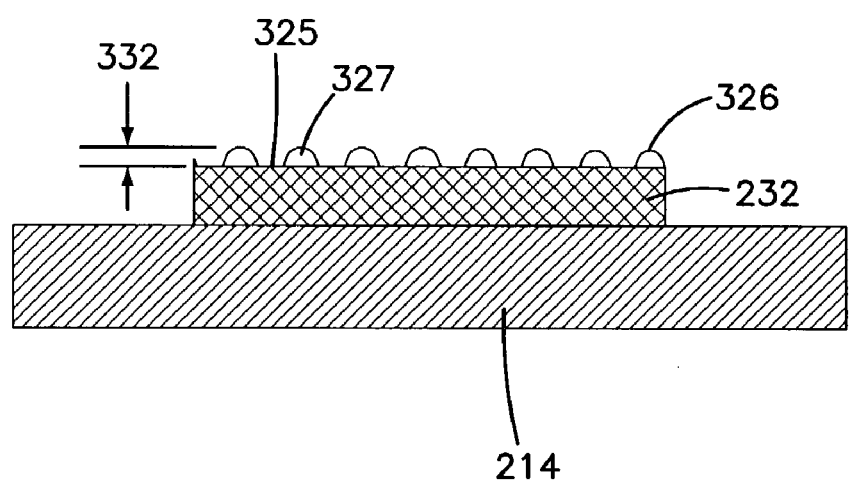
FIG. 5 is a schematic cross-sectional view of the embodiment shown in FIG. 4 after etching of the stiffener layer has taken place and the photo-resistive layer has been removed from the stiffener layer.

FIG. 5 illustrates a patterned stiffener layer 326 that has been etched using the etching patterned layer 324. Through the etching process, a thickness 330 of constraint layer 320 is reduced to a second thickness 332 shown in FIG. 5. When taking into account the voids 325 between structures 327 of the patterned stiffener layer 326, the effective thickness of the patterned stiffener layer 326 is significantly smaller than the thickness 332 of the structures 327. As a result, there is very little change in the bending stiffness of the bend section 214 due to the addition of patterned stiffener layer 326, even though the bending stiffness is related to three times the thickness ($t^3$) as discussed above. However, due to the interconnection of the structures 327 throughout the patterned stiffener layer 326, the in-plane stiffness of bend section 214 is significantly increased. Thus, the addition of the very small but interlocking structures 327 formed in a pattern such as the pattern design of layer 226 shown in FIG. 2, results in minimal impact to the bending stiffness while providing the desired increase in in-plane stiffness of the bend section.

Figure 6:
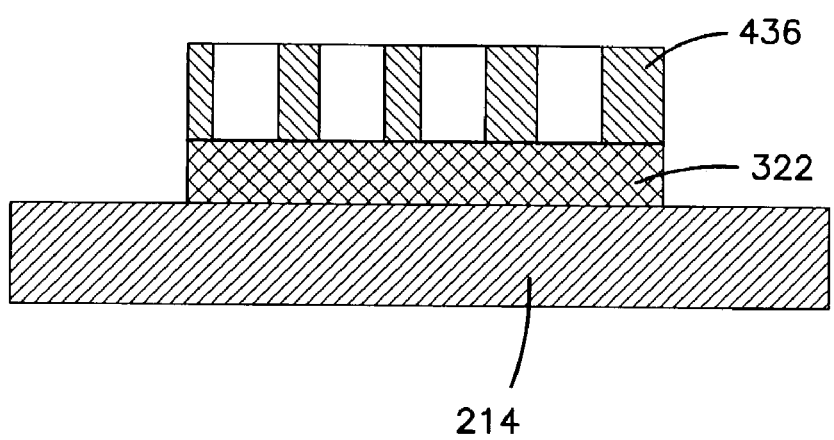
FIG. 6 is a schematic cross-sectional view of another example embodiment of a patterned stiffener layer mounted to a preload bend section of a load beam according to principles of the invention.

Referring now to FIG. 6, another method of securing a patterned stiffener layer to a bend section includes preforming the patterned stiffener layer at a location separate and distinct from the suspension assembly, and then mounting the preformed patterned stiffener layer 436 to a bend section 214 using an adhesive 322 or like connecting material. This method may provide certain advantages, such as using methods of forming and/or etching of a constraint layer into a pattered stiffener layer that are not possible for use in the presence of other suspension assembly components. However, this method may have disadvantages related to handling of a patterned stiffener layer that may be damaged or distorted when handling and/or applying the patterned stiffener layer to the bend section.

Figure 7:
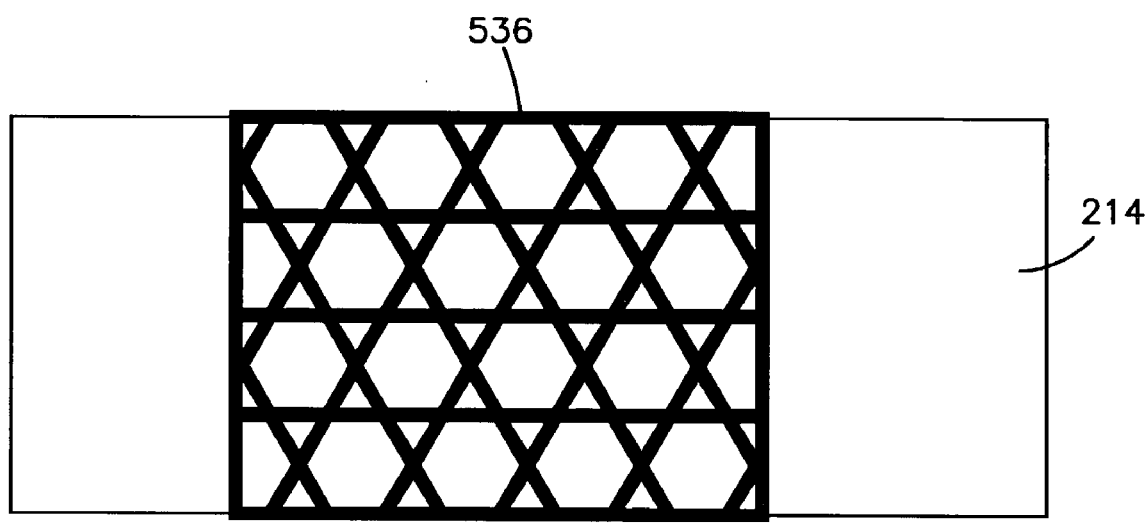
FIG. 7 is a schematic top plan view of a cage or honeycomb shaped stiffener layer embodiment according to principles of the invention.
Figure 9:
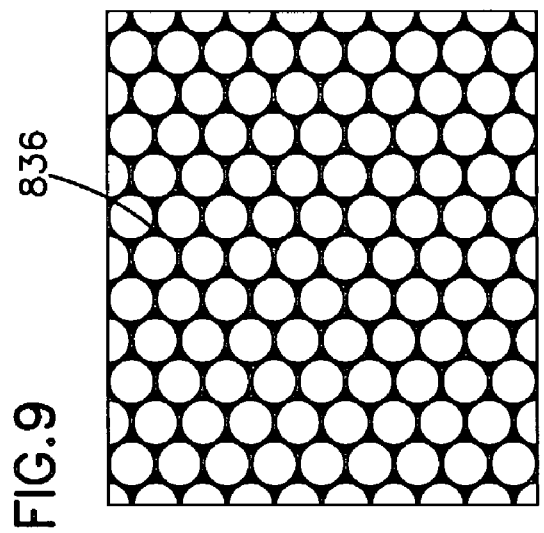
FIG. 9 is a schematic top plan view of a circular shaped stiffener layer embodiment according to principles of the invention.
Figure 8:
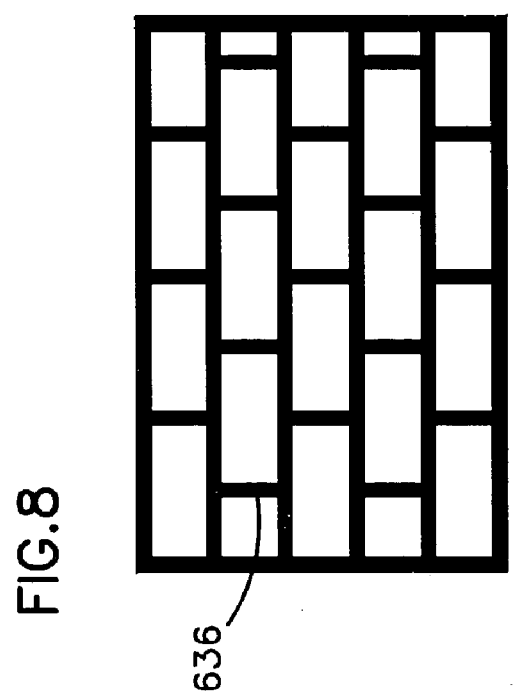
FIG. 8 is a schematic top plan view of a rectangular shaped stiffener layer embodiment according to principles of the invention.

A few example patterned stiffener layer designs 536, 636, 836 are illustrated in FIGS. 7–9, respectively. Each of these designs, in addition to the design shown in FIG. 2, may provide certain characteristics advantageous for a given suspension assembly.

The etching process using an etching patterned layer, as discussed above typically reduces the thickness of the constraint layer by about three to four times depending on the process conditions. A reduction of three times in thickness will result in a reduction of about thirty times in bending stiffness compared to a bend section that includes an unetched constraint layer. Preferably, the etching patterned layer has an aspect ratio in the range of about 5:1 to 10:1. An aspect ratio in this range typically promotes side wall etching that causes curved shapes to form in the constraint layer and starvation of the etch, that is, not etching all the way through the constraint layer. Many other aspect ratios are possible outside the above listed range.

Preferably, the patterned stiffener layer comprises a metal material such as stainless steel, or a polymer and is secured to the bend section with any of a variety of different adhesive materials. Many different connecting materials and/or methods may be used besides adhesives. Preferably, the patterned stiffener layer has a thickness (for example, thickness 332 shown in FIG. 5) of about 0.5 to 2 mils, with a more preferred thickness of about 0.5 to 1 mils.

In an alternative embodiment, the patterned stiffener layer may be integrated into the flex circuit of the suspension assembly. Methods for assembling and manufacturing flex circuits of various designs using a variety of different materials are known in the art, for example, as disclosed in U.S. Pat. No. 6,021,022, which is incorporated herein by reference in its entirety. Flex circuits generally include leads made of electrically conductive material, for example, stainless steel or other metal or metal alloy material, that electrically connect a head supported by the suspension to other components of the disc drive. The flex circuit typically also includes an insulating material, such as polyimide or other polymer material that electrically insulates the leads from the rest of the suspension assembly or other features of the disc drive that may inadvertently contact the leads.

FIGS. 10 and 11 schematically illustrate suspension assemblies 800, 900, respectively, in which a patterned stiffener is formed from the flex circuit portion of the suspension assembly. Using preexisting portions of the suspension assembly as the stiffener layer may reduce the cost and complexity of adding a patterned stiffener layer to the suspension assembly.

Assembly 800 includes a load beam 802 and flex circuit 808. Flex circuit 808 includes electrically conductive leads 804 and insulating material 806. Load beam 802 includes first and second ends 810, 812 and a bend section 814 positioned between first and second ends 810, 812. Flex circuit 808 includes a bend section portion 840 that is secured at the bend section 814. Bend section portion 840 may include first and second patterned sections 842, 844 positioned on opposing sides of the load beam. The pattern of the first and second patterned sections 842, 844 may be formed in electrical lead material in bend section portion 840 of flex circuit 808. Preferably, the lead material in bend section portion 840 in which first and second pattern sections 842, 844 are formed is electrically separated from conductive leads 804.

Assembly 900 similarly includes a load beam 902 and flex circuit 908. Flex circuit 908 includes electrically conductive leads 904 and insulating material 906. Load beam 902 includes first and second ends 910, 912 and a bend section 914 positioned between first and second ends 910, 912. Flex circuit 908 includes a bend section portion 940 that is secured at the bend section 914. Bend section portion 940 includes a first patterned section 942 and a second section 944 that is not patterned. The first and second section 942, 944 may be switched so that the patterned section is on an opposite side of bend section 914. The pattern of first section 942 may be formed in the insulating material 906 of flex circuit 908, or may be formed from both the insulating material 906 and electrically conductive material (not shown) that is part of bend section portion 940 but that is electrically separated from conductive leads 904. Forming the pattern in only the insulating material 906 or in both the insulating material and an electrically conductive material of bend section portion 940 may provide specific stiffening advantages. Furthermore, forming a pattern in only one side of the bend section portion 940, verses forming a pattern on both sides as in assembly 800, may provide specific stiffening advantages.

The bend section portions 840, 940 may include an insulating material that comprises polymer materials (such as polyimide), electrically conductive lead material that comprises metal materials (such as copper), or a combination of insulating and electrically conductive lead materials. Preferably, the insulating and electrically conductive materials of bend section portions 840, 940 are the same or similar materials used for the rest of the flex circuit. The pattern of patterned sections 842, 844 and 942 may be formed in the insulating material only, the electrically conductive lead material only, or a combination of the insulating and electrically conductive lead materials.

The flex circuits 808, 908 may be pre-fabricated flex circuits that are secured to the load beam, for example, with an adhesive, and the pattern of the patterned sections are also pre-formed in the material of the flex circuit. In other embodiments, the flex circuit may be one layer of a laminate suspension assembly, and the patterned sections are etched into the material of the flex circuit after the laminate layers are assembled together.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A suspension assembly, comprising:
a load beam including a bend section having a bending stiffness and an in-plane stiffness; and
a constraint layer cooperatively attached to the bend section, the constraint layer having a pattern formed therein, wherein the constraint layer is arranged and configured to increase the in-plane stiffness of the bend section without substantially changing the bending stiffness of the bend section, wherein the pattern comprises at least three interconnected similar shapes.

2. The assembly of claim 1, wherein the constraint layer includes a top surface and a bottom surface, the bottom surface being secured to the load beam, and to pattern includes a plurality of interconnected geometrical shapes, one or more of the shapes having a wall extending from the top surface to the bottom surface of the constraint layer.

3. The assembly of claim 1, wherein the constraint layer comprises a metal material.

4. The assembly of claim 1, wherein the constraint layer comprises a polymer material.

5. The assembly of claim 1, wherein the constraint layer is attached to the bend section with an adhesive.

6. The assembly of claim 1, wherein the pattern comprises interconnected rectangular shapes.

7. The assembly of claim 1, wherein the pattern comprises interconnected polygonal shapes.

8. The assembly of claim 1, wherein the pattern comprises interconnected circular shapes.

9. The assembly of claim 1, wherein the patterned layer is formed by etching.

10. The assembly of claim 1, wherein the constraint layer has an effective thickness of about 0.5 to 2 mils.

11. The assembly of claim 1, wherein the constraint layer has an effective thickness of about 0.5 mils.

12. The assembly of claim 1, wherein the constraint layer is part of a flex circuit extending along a length of the load beam.

13. A suspension load beam, comprising:
a bend section having an in-plane stiffness and a bending stiffness; and
a patterned layer distinct from the load beam, the patterned layer being secured to the bend section and being configured to increase the in-plane stiffness of the bend section without substantially changing the bending stiffness of the bend section, wherein the patterned layer comprises at least three interconnected similar shapes.

14. The load beam of claim 13, wherein the patterned layer comprises freestanding structures.

15. The load beam of claim 13, further comprising a first primary surface and a second primary surface, the first primary surface being arranged to face a recording medium and the second primary surface being arranged to face away from the recording medium, wherein the patterned layer is secured to the second primary surface.

16. A suspension assembly, comprising:
a load beam including a bend section having a bending stiffness and an in-plane stiffness; and
a flex circuit including a patterned section secured to the load beam at least along the bend section, the patterned section having a pattern fanned therein, wherein the patterned section is arranged and configured to increase the in-plane stiffness of the bend section without substantially changing the bending stiffness of the bend section.

17. The suspension of claim 16, wherein the patterned section of the flex circuit includes an insulating material, the pattern being formed in the insulating material.

18. The suspension of the claim 17, wherein the patterned section of the flex circuit further includes a conductive lead material, the pattern being formed in the conductive lead material and the insulating material.

19. The suspension of claim 18, wherein the conductive lead material comprises a metal material and the insulating material comprises a polymer material.

20. The suspension of claim 16, wherein the patterned section of the flex circuit includes a conductive lead material, the pattern being fanned in the conductive lead material.

21. The suspension of claim 20, wherein a first portion of the conductive lead material of the flex circuit is configured to provide an electrical connection, and a second portion of the conductive lead material does not provide an electrical connection, the pattern being formed in the second portion of conductive lead material.

22. A suspension assembly, comprising:
- a load beam including a bend section having a bending stiffness and an in-plane stiffness; and
- a patterned constraint layer coupled to the bend section of the load beam,
- wherein the patterned constraint layer comprises at least three interconnected similar shapes.

23. The suspension assembly of claim 22, wherein the patterned constraint layer comprises a metal.

24. The suspension assembly of claim 22, wherein the patterned constraint layer comprises a polymer.

25. The suspension assembly of claim 22, wherein the patterned constraint layer is coupled to the bend section of the load beam with an adhesive.

26. The suspension assembly of claim 22, wherein the patterned constraint layer has a thickness between about 0.5 mils and about 2 mils.

27. The suspension assembly of claim 22, wherein the patterned constraint layer forms at least a portion of a flex circuit.

28. The suspension assembly of claim 22, wherein the patterned constraint layer includes a polygonal shaped pattern.

29. The suspension assembly of claim 22, wherein the patterned constraint layer includes a circular shaped pattern.

* * * * *